US006745719B1

(12) United States Patent
Howerton

(10) Patent No.: US 6,745,719 B1
(45) Date of Patent: Jun. 8, 2004

(54) LITTER SIFTING DEVICE FOR A LITTER BOX

(76) Inventor: Diane Howerton, 516 A W. Wilson, Banning, CA (US) 92220

( * ) Notice: Subject to any disclaimer, the term of this patent is extended or adjusted under 35 U.S.C. 154(b) by 0 days.

(21) Appl. No.: 10/425,455

(22) Filed: Apr. 28, 2003

(51) Int. Cl.[7] .............................................. A01K 29/00
(52) U.S. Cl. ...................................................... 119/166
(58) Field of Search ................................. 119/166, 165; 209/393, 394, 396, 398, 401, 402, 625, 626

(56) References Cited

U.S. PATENT DOCUMENTS

| 1,097,439 | A | * | 5/1914 | Jacquette | 209/665 |
|---|---|---|---|---|---|
| 1,289,778 | A | * | 12/1918 | Houck | 209/394 |
| 2,963,003 | A | * | 12/1960 | Oberg et al. | 119/166 |
| 3,141,441 | A | | 7/1964 | Russell | |
| 4,802,442 | A | | 2/1989 | Wilson | 119/1 |
| 5,463,982 | A | * | 11/1995 | Murphy | 119/166 |
| 5,507,248 | A | * | 4/1996 | Gabbert | 119/166 |
| 5,515,812 | A | * | 5/1996 | Faust | 119/166 |
| 5,531,186 | A | * | 7/1996 | Flood et al. | 119/166 |
| 5,598,811 | A | * | 2/1997 | Merchant | 119/166 |
| D404,854 | S | * | 1/1999 | Howarth | D30/161 |

* cited by examiner

Primary Examiner—Michael J. Carone
Assistant Examiner—Jordan Lofdahl
(74) Attorney, Agent, or Firm—Goldstein Law Offices, P.C.

(57) ABSTRACT

A litter sifting device for use with an existing litter box. The device has a first screen assembly and a second screen assembly, each having a screen, two handles, and two side walls. The screen has a mesh size which is small enough to permit unused litter to fall back into the litter box, while retaining soiled litter, when the device is removed from the litter box for appropriate disposal of the waste material. For smaller litter boxes, the first screen assembly may be used alone. For larger litter boxes, the second screen assembly may be used in conjunction with the first screen assembly. The first screen assembly is telescopically positionable within the second screen assembly, thereby allowing a range of possible lengths for the litter sifting device. The handles permit lifting the litter sifting device from the litter box without a user coming into contact with the soiled litter.

9 Claims, 5 Drawing Sheets

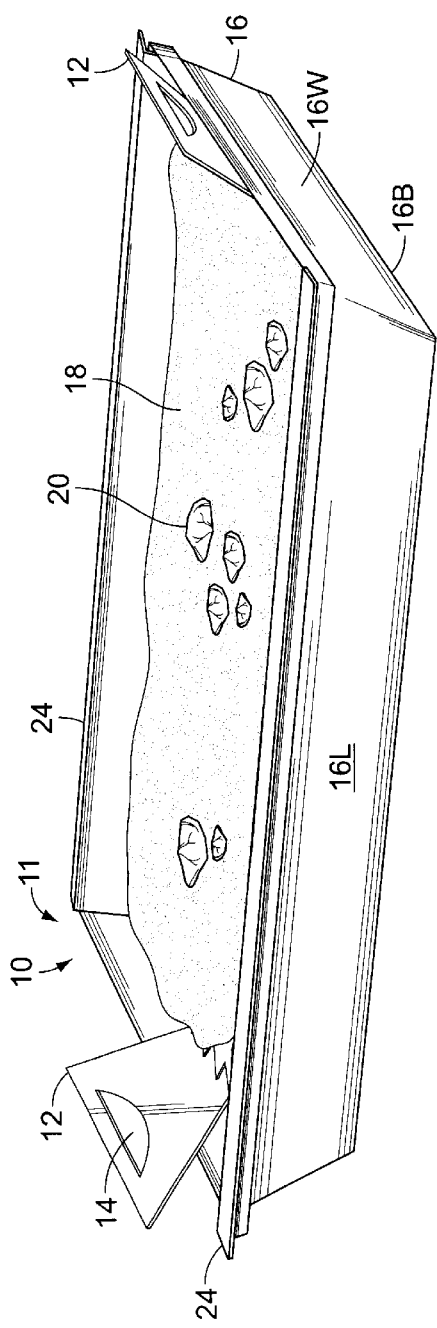
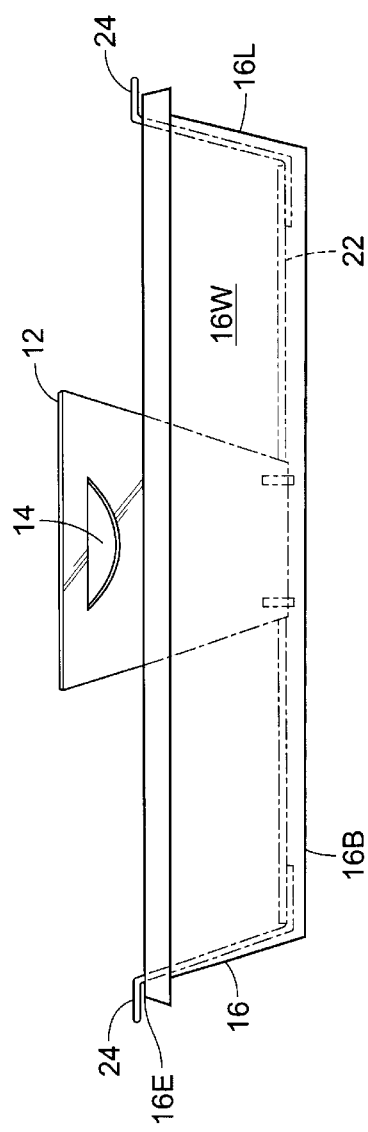
FIG. 1
FIG. 2

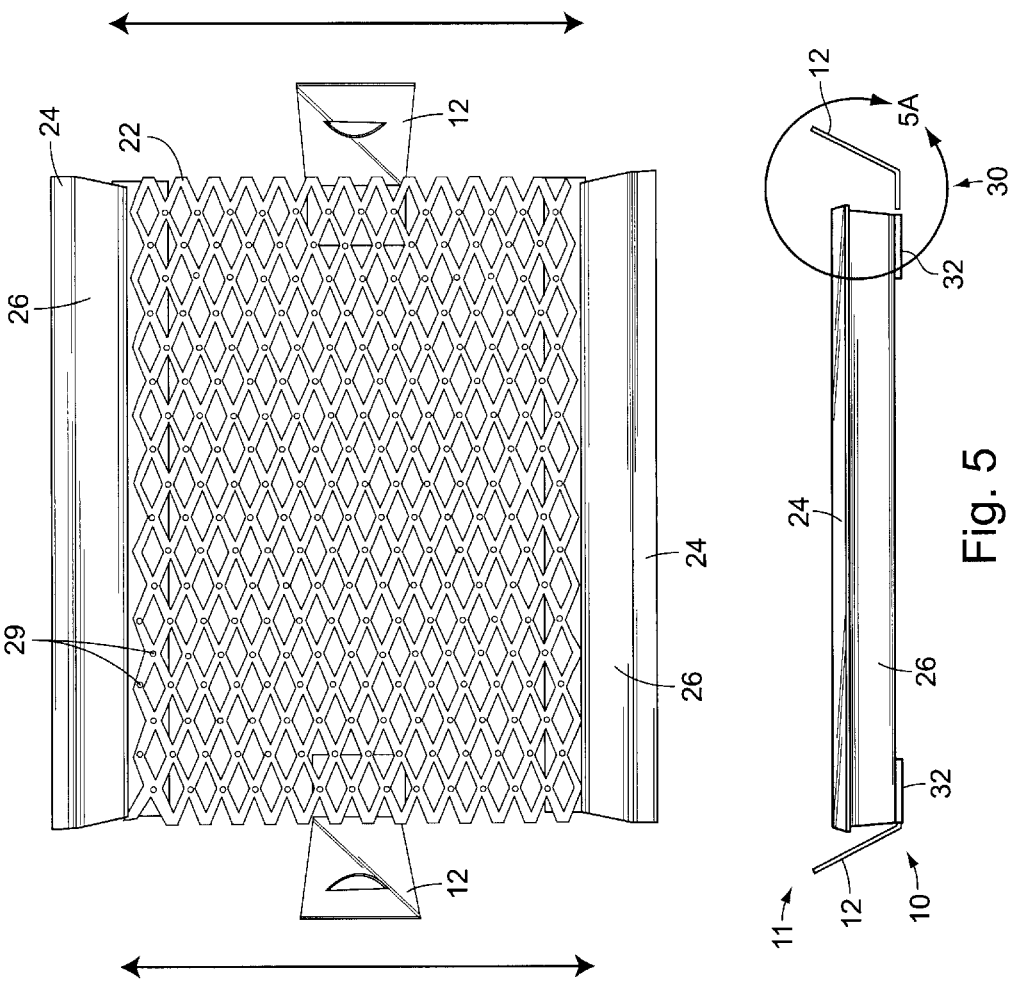

LITTER SIFTING DEVICE FOR A LITTER BOX

BACKGROUND OF THE INVENTION

1. Field of the Invention

The invention generally relates to a litter sifting device for a litter box, and in particular it relates to a litter sifting device having a first and a second screen assembly, wherein the width of each screen assembly is adjustable, and wherein the overall length of the litter sifting device may be varied by telescopically positioning the second screen assembly within the first screen assembly.

2. Description of the Related Art

An owner of a "house cat" generally provides a litter box for the cat for elimination of waste material by the cat. Litter boxes obviously require frequent cleaning by the owner. Generally, when cleaning a litter box, the owner scoops out the soiled litter and leaves the unused litter in the litter box. However, it is difficult and time consuming to remove the soiled litter, while leaving the unused litter in the box. Accordingly, there is a need for a litter sifting device which allows unused litter to fall back into the box, while retaining the soiled litter for easy and sanitary disposal into an appropriate waste receptacle.

A variety of litter sifting devices are available. For example, U.S. Pat. No. 4,802,442 to Wilson appears to show a litter sifting device having mesh with handles and side panels, for removing fecal material from a litter box.

Additionally, U.S. Pat. No. 2,963,003 to Oberg appears to show a litter sifting device comprising a sieve and frame assembly for removing fecal material from a litter box. Furthermore, U.S. Pat. No. 3,141,441 to Russell appears to show a litter sifting device having bottom panels of a mesh material for removing fecal material from a litter box.

None of these devices appear to show a litter sifting device having a first screen assembly and also a second screen assembly, each having screens, wherein the width of the device may be adjusted by pushing or pulling the side walls of the assemblies toward or away from each other, and wherein the overall length of the device may be adjusted by telescopically positioning the second screen assembly within the first screen assembly, thereby allowing use of the litter sifting device with variously dimensioned litter boxes.

While these units may be suitable for the particular purpose employed, or for general use, they would not be as suitable for the purposes of the present invention as disclosed hereafter.

SUMMARY OF THE INVENTION

It is an object of the invention to produce a litter sifting device which enables convenient and facile removal of waste material from a litter box. Accordingly the litter sifting device has screens having a mesh size which is large enough to retain clumped, soiled litter, thereby enabling convenient and facile removal of waste material from the litter box.

It is another object of the invention to produce a litter sifting device which provides for economical use of the litter within the litter box. Accordingly, the litter sifting device has screens having a mesh size which allows unused litter to fall back into a litter box and to be reused, thereby providing for economical use of the litter within the litter box.

It is yet another object of the invention to produce a litter sifting device which allows for sanitary removal of soiled litter from the litter box. Accordingly, the litter sifting device has two screen assemblies, each having handles extending therefrom, for easy lifting of the device from the litter box for subsequent disposal of the soiled litter.

It is an additional object of the invention to produce a litter sifting device which may be used with variously sized litter boxes. Accordingly, the width of each screen assembly is adjustable, and the overall length of the litter sifting device may be varied by telescopically positioning the lip of the first screen assembly within the track of the second screen assembly, thereby allowing use of the device with variously sized litter boxes.

It is another object of the invention to produce a litter sifting device which is not unduly expensive. Accordingly, the litter sifting device is constructed from inexpensive materials and its cost is not prohibitive.

The invention is a litter sifting device for use with an existing litter box. The device has a first screen assembly and a second screen assembly, each having a screen, two handles, and two side walls. The screen has a mesh size which is small enough to permit unused litter to fall back into the litter box, while retaining soiled litter, when the device is removed from the litter box for appropriate disposal of the waste material. For smaller litter boxes, the first screen assembly may be used alone. For larger litter boxes, the second screen assembly may be used in conjunction with the first screen assembly. The first screen assembly is telescopically positionable within the second screen assembly, thereby allowing a range of possible lengths for the litter sifting device. The handles permit lifting the litter sifting device from the litter box without a user coming into contact with the soiled litter.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a perspective view of a first screen assembly of a litter sifting device being used in conjunction with an existing litter box.

FIG. 2 is a side elevational view of the first screen assembly of the litter sifting device being used in conjunction with the existing litter box.

FIG. 4 is a top elevational view of the first screen assembly of the litter sifting device.

FIG. 5 is a side elevational view of the first screen assembly of the litter sifting device.

DETAILED DESCRIPTION OF THE PREFERRED EMBODIMENTS

Figure 6:
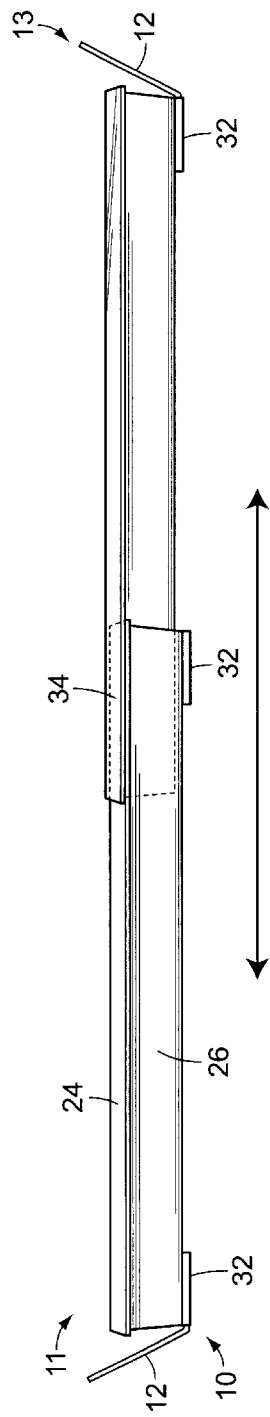
FIG. 6 is a side elevational view of a second screen assembly being used in conjunction with the first screen assembly, to provide a longer litter sifting device for a longer litter box.
Figure 7:
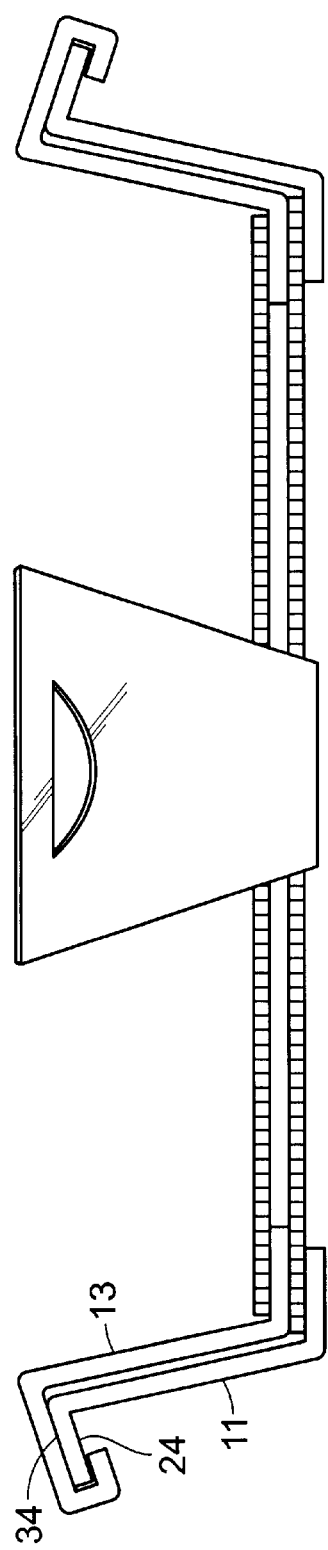
FIG. 7 is a side elevational view further detailing the first screen assembly positioned within the second screen assembly.

FIGS. 1–5A illustrate a first embodiment of a litter sifting device 10, having a first screen assembly 11. FIGS. 6–7 illustrate a second embodiment of the litter sifting device 10, having a first screen assembly 11 and also having a second screen assembly 13. The first screen assembly 11 is used alone for smaller sized litter boxes. The first screen assembly 11 is used in conjunction with the second screen assembly 13 when the device is used with larger sized litter boxes, as will be described in greater detail hereinafter. Each of these embodiments is discussed in turn.

Figure 3:
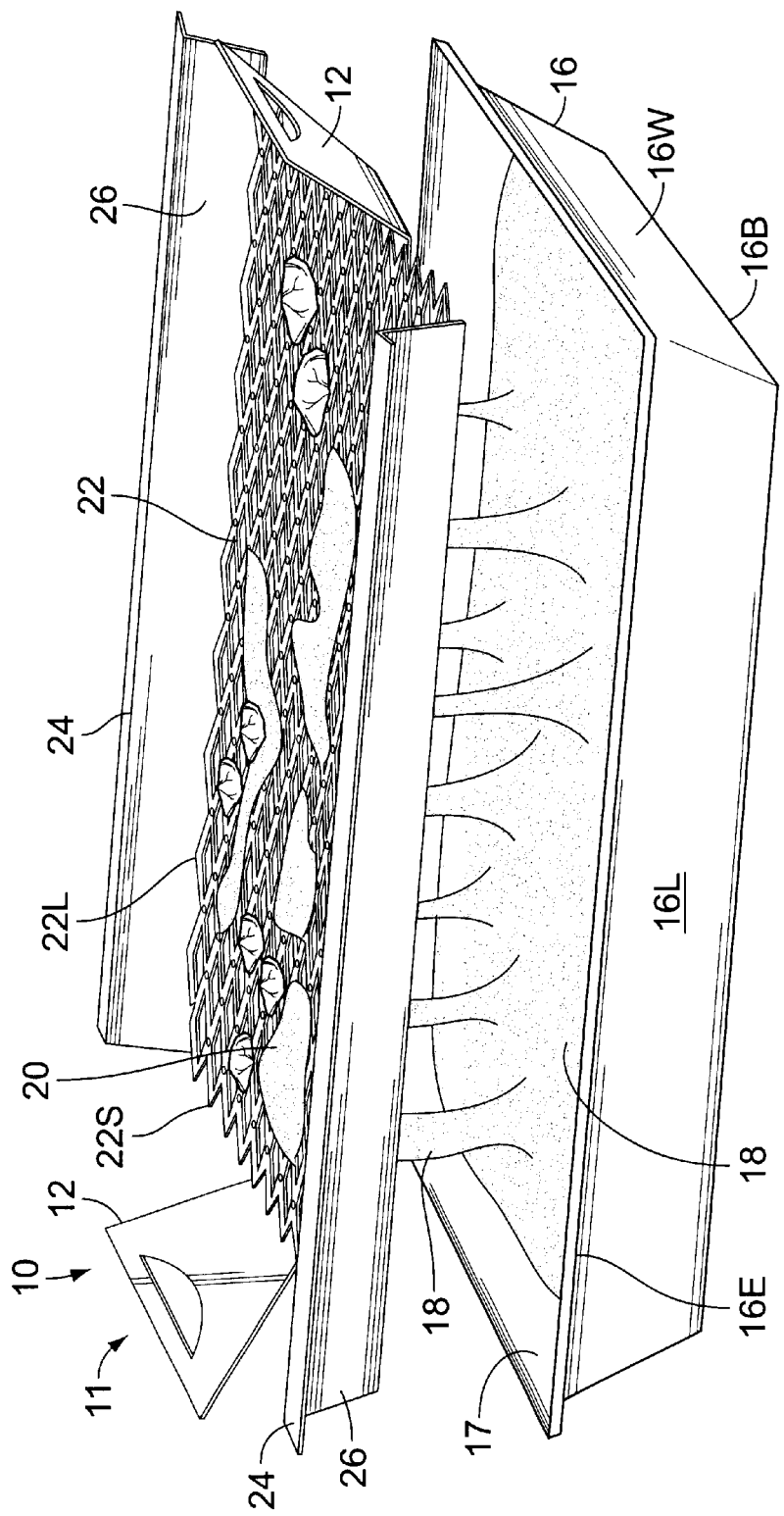
FIG. 3 is a perspective view of the first screen assembly of the litter sifting device being lifted out of the existing litter box.

FIG. 3 illustrates the first screen assembly 11 being removed from an existing litter box 16. In the first embodiment, the litter sifting device 10 comprises the first screen assembly 11, having a substantially rectangular screen having two long sides 22L and two short sides 22S, a pair of opposing side walls 26 extending upward from each of the two long sides 22L, and a pair of opposing handles 12 extending upward from each of the two short sides 22S. The substantially rectangular litter box 16 has two opposing shorter walls 16W, two opposing longer walls 16L, a bottom 16B, and top edges 16E which define an opening 17 in the litter box 16. The opposing side walls 26 of the first screen assembly 11 each have a top lip 24, for supporting the first screen assembly 11 upon the top edges 16E of the litter box 16 at a position which is elevated with respect to the bottom 16B of the litter box 16.

The screen 22 is a lattice of one group of parallel members mated to another group of parallel members with hinge rivets. Hinge rivets also join the screen 22 to the opposing side walls 26. The hinge rivets 29 which join the groups of opposing parallel members of the screen 22, illustrated in FIG. 4, allow the overall width of the screen 22 to be adjusted by a user, by either pulling the side walls 26 apart, or by pushing the side walls 26 together.

Figure 5A:
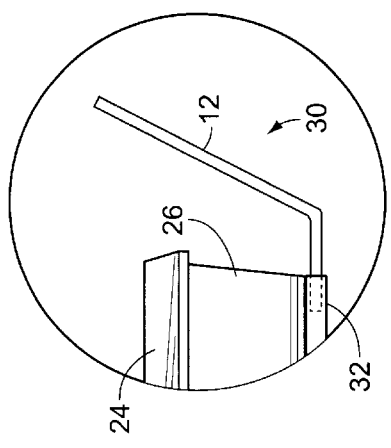
FIG. 5A is an enlarged view of one of the handles of the first screen assembly, taken generally in the area of circle 5A in FIG. 5.

Turning momentarily to FIG. 5, a side elevational view, the first screen assembly 11 has a pair of handle assemblies 30, each including a handle receiving sleeve 32, attached to and beneath the screen 22, and a handle 12 selectively received within the handle receiving sleeve 32. The handles 12 are wider at the top and have openings 14 which allow the handles 12 to be easily grasped by a hand of the user. The handle 12 is easily removed from the handle receiving sleeve 32, when the litter sifting device 10 needs to be cleaned. One handle 12 is also removed when the first screen assembly 11 is used in conjunction with the second screen assembly 13, as will be described below. FIG. 5A illustrates an enlarged view of one of the handles 12 of the first screen assembly 11, taken generally in the area of circle 5A in FIG. 5, wherein the handle 12 is positioned within the handle receiving sleeve 32. When the litter sifting device 10 is lifted by its handles 12 from the litter box 16, the screen 22 allows the unused litter 18 to fall back into the box 16, while retaining the waste material 20 upon the screen 22.

FIG. 1 illustrates a view wherein the first screen assembly 11 of the litter sifting device 10 is positioned within a litter box 16. The litter box 16 has been utilized by a cat for excretion. Waste material 20 and unused litter 18 obscure the top of the screen 22. As described above, the waste material 20 remains on top of the screen 22 when the litter sifting device 10 is removed from the litter box 16, thereby allowing facile and hygienic disposal of the waste material 20.

FIG. 2 illustrates a side elevational view of the litter sifting device 10 being used in conjunction with an existing litter box 16. The lip 24 of the first screen assembly 11 rests upon the top edges 16E of the litter box 16, thereby supporting the screen 22 at a position which is elevated with respect to the bottom 16B of the litter box 16.

The first screen assembly 11 can be used alone in a smaller litter box 16, as shown in FIGS. 1–5A and as described above. Alternatively, the first screen assembly 11 may be used in conjunction with the second screen assembly 13, as shown in FIGS. 6–7, in order to provide a litter sifting device 10 for use with larger sized litter boxes. FIG. 6 illustrates a side elevational view of the second screen assembly 13 being used in conjunction with the first screen assembly 11 for a larger litter box. One of the handles 12 has been removed from each screen assembly 11, 13, in order that the second screen assembly 13 may be telescopically positioned within the first screen assembly 11. The first screen assembly 11 has a top lip 24 and the second screen assembly 13 has a top track 34. The top lip 24 slides within the top track 34, thereby allowing the overall length of the litter sifting device 10 to be telescopically adjusted. The second screen assembly 13 has a height which allows its screen 22 to move freely in the longitudinal direction when its top track 34 is engaged with the top lip 24 of the first screen assembly 11. The width of the litter sifting device 10 is adjusted by pulling or pushing the opposed mated track and lip combinations toward or away from each other.

FIG. 7 illustrates a side elevational view further detailing the top lip 24 of the first screen assembly 11 positioned within the top track 34 of the second screen assembly 13.

In use, the litter sifting device 10 may be used in conjunction with variously sized litter boxes 16. The first screen assembly 11 may be used by itself for smaller sized litter boxes 16. For a larger box 16, the first screen assembly 11 is telescopically positioned within the second screen assembly 13 to achieve a longer overall length. The first screen assembly 11 and the second screen assembly 13 are longitudinally adjusted with respect to each other by telescoping the lip 24 of the first screen assembly 11 within the track 34 of the second screen assembly 13. To adjust the width of the litter sifting device 10, the side walls 26 of both the first and second screen assemblies 11,13 are pushed inward for narrower litter boxes 16, and pulled outward for wider boxes 16, thereby adjusting the overall width of the screens 22. The litter sifting device 10 is then placed into the litter box 16, and enough litter 18 is added to the litter box 16 to cover the exposed surfaces of both of the screens 22. After use of the litter box 16 by the cat for excretion, the user lifts the litter sifting device 10 by the handles 12. The unused litter 18 falls through the screens 22 and back into the litter box 16, and the waste material 20 remaining on top of the screens 22. The clumped waste material 20 is easily and sanitarily disposed of, and the litter sifting device 10 is placed back within the litter box 16. The user gently shakes the litter box 16 back and forth, until the litter 18 once again covers the screens 22.

In conclusion, herein is presented a litter sifting device for use with an existing cat litter box. The invention is illustrated by example in the drawing figures, and throughout the written description. It should be understood that numerous variations are possible, while adhering to the inventive concept. Such variations are contemplated as being a part of the present invention.

What is claimed is:

1. A litter sifting device, for use in conjunction with a litter box having a bottom, side walls, and top edges, said litter box for containment of litter therein, comprising a first screen assembly, having:

a substantially rectangular screen having a first set of opposing sides and a second set of opposing sides, said screen being a lattice of one group of parallel members mated to an opposing group of parallel members, said screen having hinge rivets which join the groups of opposing parallel members of the screen;

a side wall extending upwards from each of the sides of the first set of opposing sides of the screen, each side wall having a top lip for supporting the first screen assembly upon the top edges of the litter box at a position which is elevated with respect to the bottom of the litter box, wherein the distance between the opposing side walls may be adjusted by either pulling the side walls apart or by pushing the side walls together, thereby causing the groups of parallel members of the screen to partially swivel upon the hinge rivets with respect to each other, thereby causing the overall width of the screen to expand or contract; and a pair of handles extending upward from each of the sides of the second set of opposing sides of the screen.

2. The litter sifting device as recited in claim 1, further comprising a pair of handle receiving sleeves for selective containment therein of each of the handles, each handle receiving sleeve attached to one of the sides of the second set of opposing sides of the screen, wherein the handle is easily removed from the handle receiving sleeve when the litter sifting device is cleaned, and wherein the handle and its associated handle receiving sleeve together comprise a handle assembly for lifting the litter sifting device.

3. The litter sifting device as recited in claim 2, further comprising a second screen assembly for use in conjunction with the first screen assembly, said second screen assembly comprising a screen which is substantially identical to the screen of the first screen assembly, said second screen assembly also having substantially identical handle assemblies, said second screen assembly also having two side walls, wherein the first screen assembly may be telescopically positioned within the second screen assembly so that the overall length of the litter sifting device may be adjusted, after selectively removing one of the handles from both the first screen assembly and the second screen assembly, and wherein the overall width of the litter sifting device may be varied by pulling or pushing the side walls of each of the screen assemblies toward or away from each other in order to vary the resulting width of the attached screens.

4. The litter sifting device as recited in claim 3, wherein the handles are wider at the top and have openings which allow them to be easily grasped by a hand of a user.

5. The litter sifting device as recited in claim 4, wherein at least one of the side walls of the first screen assembly has a top lip and wherein at least one of the side walls of the second screen assembly has a top track, wherein the at least one top lip slides within the at least one top track, thereby allowing the overall length of the litter sifting device to be adjusted.

6. The litter sifting device as recited in claim 5, wherein the second screen assembly has a height which allows its screen to move freely in the longitudinal direction when its top track is engaged with the top lip of the first screen, and wherein the width of the litter sifting device can be adjusted by pulling or pushing the opposed mated track and lip combinations toward or away from each other.

7. A method of using a litter sifting device, said litter sifting device having a first screen assembly having a screen having a first set of opposing sides and also a second set of opposing sides, said screen being a lattice of one group of parallel members mated to another group of parallel members with hinge rivets so that the groups of parallel members may swivel with respect to each other, said first screen assembly having a pair of opposing side walls extending upward from each of the sides of the first set of opposing sides of the screen, each side wall having a top lip for supporting the first screen assembly upon the top edges of the litter box at a position which is elevated with respect to the bottom of the litter box, wherein the width of the screen may be adjusted by either pulling the side walls apart, or by pushing the side walls together, thereby causing the opposing groups of parallel members of the screen to partially swivel with respect to each other upon the hinge rivets, said first screen assembly also having a pair of opposing handles extending upward from each of the sides of the second set of opposing sides of the screen, said method comprising the steps of:

a) adjusting the width of the screen of the litter sifting device to the width of the litter box by pushing the side walls inward for narrower litter boxes, and pulling the side walls outward for wider boxes;

b) positioning the litter sifting device within the litter box;

c) covering the screen with litter;

d) waiting by the user until the litter box is used by a cat for excretion of waste material;

e) separating waste material from unused litter by lifting the litter sifting device by its handles and shaking the litter sifting device;

f) emptying the waste material from the first screen assembly into a waste receptacle; and g) returning the litter sifting device back to the litter box.

8. The method of using a litter sifting device as recited in claim 7, wherein the handles are selectively contained within a handle receiving sleeve, wherein the step of emptying the waste material from the first screen assembly is followed by the step of removing the handle from the handle removing sleeve so that the screen can be easily cleaned.

9. The method of using a litter sifting device as recited in claim 8, wherein said litter sifting device further comprises a second screen assembly for use in conjunction with the first screen assembly, said second screen assembly comprising a screen which is substantially identical to the screen of the first screen assembly, said second screen assembly also having handle assemblies which are substantially identical to those of the first screen assembly, said second screen assembly also having two opposing side walls which extend upward from two opposing sides of the screen, wherein the first screen assembly may be telescopically positioned within the second screen assembly after selective removal of one of the handles from each screen assembly, wherein the step of adjusting the width of the screen further comprises the step of adjusting the width of the litter sifting device by pushing the screens of both the first and second screen assemblies inward for narrower litter boxes, and pulling the screens outward for wider boxes, and wherein the step of positioning the litter sifting device within the litter box is preceded by the step of telescopically positioning the first screen assembly within the second screen assembly to achieve an overall length of the litter sifting device which matches the length of the litter box.

* * * * *